(12) United States Patent
Asai et al.

(10) Patent No.: US 12,276,249 B2
(45) Date of Patent: Apr. 15, 2025

(54) WIND-SPEED ACCELERATING WIND TURBINE

(71) Applicant: GREEN POWER BY ACCELERATED FLOW RESEARCH LIMITED LIABILITY COMPANY, Kanagawa (JP)

(72) Inventors: Souichirou Asai, Kanagawa (JP); Kunimitsu Sato, Kanagawa (JP); Norio Seitoku, Saitama (JP); Yasutaka Yoshiba, Chiba (JP); Kouji Yamada, Kanagawa (JP)

(73) Assignee: GREEN POWER BY ACCELERATED FLOW RESEARCH LIMITED LIABILITY COMPANY, Kanagawa (JP)

( * ) Notice: Subject to any disclaimer, the term of this patent is extended or adjusted under 35 U.S.C. 154(b) by 0 days.

(21) Appl. No.: 18/569,590

(22) PCT Filed: Mar. 28, 2022

(86) PCT No.: PCT/JP2022/015000
§ 371 (c)(1),
(2) Date: Dec. 12, 2023

(87) PCT Pub. No.: WO2023/166750
PCT Pub. Date: Sep. 7, 2023

(65) Prior Publication Data
US 2024/0280075 A1    Aug. 22, 2024

(30) Foreign Application Priority Data
Mar. 4, 2022 (JP) .................. 2022-033188

(51) Int. Cl.
*F03D 1/04* (2006.01)

(52) U.S. Cl.
CPC .................. *F03D 1/041* (2023.08)

(58) Field of Classification Search
CPC . F03D 1/04; F03D 1/041; F03D 1/042; F03D 1/044; F03D 1/046; F03D 1/051
See application file for complete search history.

(56) References Cited

U.S. PATENT DOCUMENTS 4,021,135 A * 5/1977 Pedersen .................. F03D 1/04
                                                          415/908
4,166,596 A * 9/1979 Mouton, Jr. ............. F03D 9/25
                                                           244/33

(Continued)

FOREIGN PATENT DOCUMENTS

JP    2003-049760 A    2/2003
JP    2003-278635 A    10/2003

(Continued)

OTHER PUBLICATIONS

Asai et al., "Wind-collecting Wind Turbine" Machine Translation, WO 2014038661, WIPO, Mar. 13, 2014 (Year: 2014).*

(Continued)

*Primary Examiner* — David E Sosnowski
*Assistant Examiner* — Joshua R Beebe
(74) *Attorney, Agent, or Firm* — HAUPTMAN HAM, LLP

(57) ABSTRACT

A wind-speed accelerating wind turbine has the wind turbine installed in the nacelle, the nacelle has a front nacelle member having a cross-section area formed so as to linearly or curvilinearly contract from a wind inlet to an installed position of the wind turbine and has a rear nacelle member having the contracted cross-section area formed so as to linearly or curvilinearly expand or maintain the same cross-section area from the installed position of the wind turbine to a wind outlet, and a wind dispersion part or a wind (Continued)

dispersion shape is provided at the wind outlet of the rear nacelle member.

7 Claims, 12 Drawing Sheets

(56) References Cited

U.S. PATENT DOCUMENTS

| | | | | |
|---|---|---|---|---|
| 4,320,304 | A * | 3/1982 | Karlsson | F03D 1/04 |
| | | | | 415/908 |
| 5,464,320 | A * | 11/1995 | Finney | F03D 1/04 |
| | | | | 415/60 |
| 6,382,904 | B1 * | 5/2002 | Orlov | F03D 13/20 |
| | | | | 415/908 |
| 9,194,362 | B2 * | 11/2015 | Merlini, III | F03D 9/25 |
| 2003/0178856 | A1 * | 9/2003 | Ohya | F03D 1/04 |
| | | | | 290/55 |
| 2011/0014038 | A1 * | 1/2011 | Werle | F03D 1/04 |
| | | | | 415/214.1 |
| 2011/0042952 | A1 * | 2/2011 | Ohya | F03B 1/04 |
| | | | | 290/55 |
| 2011/0091311 | A1 * | 4/2011 | Uehara | F01D 1/04 |
| | | | | 415/4.1 |
| 2013/0272841 | A1 * | 10/2013 | Hjort | F03D 1/04 |
| | | | | 415/4.3 |

FOREIGN PATENT DOCUMENTS

| | | |
|---|---|---|
| JP | 2008-520900 A | 6/2006 |
| JP | 2011-140887 A | 7/2011 |
| JP | 2016-001001 A | 1/2016 |
| JP | 6033870 B2 | 11/2016 |
| JP | 6110455 B2 | 4/2017 |
| WO | 2009063599 A1 | 5/2009 |

OTHER PUBLICATIONS

Asai et al., "Wind Collecting Type Wind Turbine" Machine Translation, JPO, JP2011140887A, Jul. 21, 2011 (Year: 2011).*

* cited by examiner

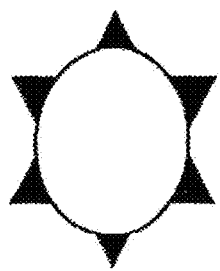 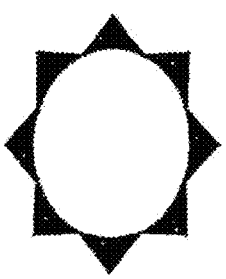 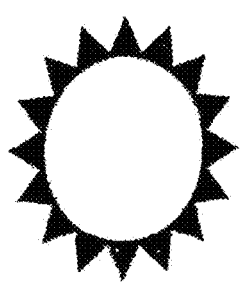
HEXAGONAL SHAPE
FIG. 2A
EIGHT-POINTED SHAPE
FIG. 2B
16-POINTED SHAPE
FIG. 2C
FIG. 3
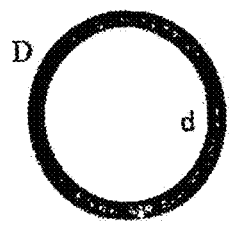
FIG. 4
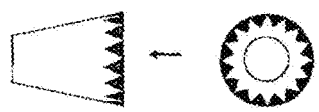
FIG. 5
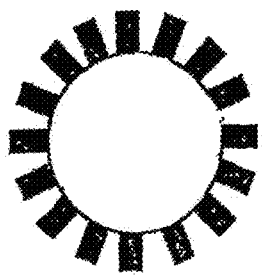

18-POINTED SHAPE

WIND-SPEED ACCELERATING WIND TURBINE

RELATED APPLICATIONS

The present application is a National Phase of International Application No. PCT/JP2022/015000 filed Mar. 28, 2022, which claims priority to Japanese Application No. 2022-033188, filed Mar. 4, 2022.

TECHNICAL FIELD

The present invention relates to a wind-speed accelerating wind turbine and relates to the wind-speed accelerating wind turbine that increases the wind speed in the rear of a wind turbine and the wind speed at a vent part of a nacelle, thereby improving the rotation efficiency of vanes of the wind turbine, increasing generated power, and improving the problem of the height of installation, stability of the apparatus, and stability of nacelle support.

BACKGROUND ART

Recently, prevention of global warming has been demanded, and there is an urgent need to develop new clean energy. A wind power generation system, which does not discharge $CO^2$, has drawn attention as one of the clean energy sources. However, under current circumstances, wind power generation has an extremely low position as alternative energy to oil. A means for effectively capturing wind power energy has to be developed.

Conventionally, wind power generation using a lift-type propeller wind turbine has been a mainstream as a means to capture wind power energy. In the case of the lift-type propeller wind turbine, there is a problem that the wind turbine per se is large since long large blades (propeller blades) are required. The energy efficiency thereof is around 40%, in other words, around 40% of wind power energy is captured under current circumstances. Incidentally, the theoretical maximum efficiency thereof is 59.3% (Betz's law).

The above mentioned wind turbine for wind power generation has been developed so that (1) the wind turbine is provided with vanes having a rotor diameter as large as possible, (2) the wind turbine is as tall as possible, and (3) the wind turbine is installed at a location where wind blows as much as possible.

However, an increased diameter of rotor vanes for capturing wind as much as possible requires a tall tower, which is not stable against strong wind, and there is a problem that operation has to be stopped to avoid damage when wind is too strong. Also, the building cost thereof is as enormous as hundreds of millions of yen.

When people pass between buildings or arcade streets, they sometimes encounter unexpected strong wind. This is for a reason that the wind blocked by building walls, etc. seeks voids and is concentrated between the buildings or on passable locations of the arcade street. This is conceivably a form of the Laval nozzle effect. Therefore, there has been proposed a wind power generation apparatus in which a wind turbine is disposed in the vicinity of a central part, in other words, a minimum cross-sectional area of a Laval nozzle having a shape of front and rear connected converging nozzles (Patent Literature 1).

The present inventors have provided a dividing wall between a fan and a wind turbine, formed a hole on the wall surface, sent wind by the fan through the hole, placed the wind turbine immediately after the hole, and studied the rotation speed of the wind turbine. As a result, surprisingly, it was found out that the rotation speed of the wind turbine dropped by far compared with a case in which wind was sent directly from the fan to the wind turbine without providing the dividing wall. More specifically, it has been found out that, for rotating a wind turbine, not only the front wind which hits the wind turbine, but also the volume of the wind which passes from the periphery of the wind turbine to the rear thereof is also important. There has been proposed a wind-collecting wind turbine which increases the power generation efficiency of a wind turbine by sending a large volume of wind power to the rear of the wind turbine converged by an outer nacelle of a double-structure nacelle (Patent Literature 2).

The above mentioned wind-collecting wind turbine functions on following principles. In a case in which the speed of the air which passes a wind turbine is V, the density thereof is ρ, and the pressure thereof is P, collected wind reduces pressure energy and increases kinetic energy since the total energy of the wind per unit volume is $(½)ρV^2+P=$constant. This reduces entropy (S) since this is streamlining (opposite of randomization) of V and P. Therefore, free energy increases by $-TΔS$ (T: temperature). Therefore, the collecting type has higher energy efficiency. However, this is the case in which a steady flow of a Bernoulli flow tube is supposed. When a wind turbine is placed in this case to extract energy, V behind the wind turbine is reduced, and P increases. Therefore, to make this close to a steady flow, low-speed flows have to be speeded up by friction of high-speed flows outside a flow tube. In other words, the air molecules at reduced speeds behind the wind turbine are driven toward the rear by high-speed air molecules (Patent Literature 3).

Furthermore, in order to drive the air molecules behind the wind turbine, it is effective to provide gaps at both lateral sides and both upper and lower sides of a wind turbine installed in an intermediate nacelle so that wind blows therethrough and to cause wind having a high wind speed to flow therethrough (Patent Literature 4).

CITATION LIST

Patent Literature

Patent Literature 1: JP 2008-520900 A
Patent Literature 2: JP 2011-140887 A
Patent Literature 3: JP 6033870 B2
Patent Literature 4: JP 6110455 B2

SUMMARY OF INVENTION

Technical Problem

Above described Patent Literature 3 and Patent Literature 4 are basic ideas of the present invention. Details thereof will be described below.

When people pass between buildings or arcade streets, they often encounter unexpected strong wind. This is for a reason that the wind blocked by building walls, etc. seeks voids and is concentrated between the buildings or on passable locations of the arcade street. In a case in which the mass of passing air is m, the density thereof is ρ, and the wind speed thereof is V, since $(½)ρV^2+P=$constant, if the energy of the wind per unit volume is blocked by walls and has a speed of 0, the energy comes only from the pressure, and walls of air having a high pressure are generated on the walls of both sides of the entrance between buildings or the like. It is conceived that this serves as a nacelle duct and increases the wind speed.

Therefore, as illustrated in FIGS. 7A and 7B, fans 11 (φ=240 mm) and wind turbines 12 (φ=150 mm) were disposed at an interval of about 750 mm, flange-shaped wall members 13a and 13b were provided outside the rims of wind inlets of the wind turbines 12, respectively, and the rotation speeds of the wind turbines 12 in the case in which wind was sent from the fans 11 were observed. The outer diameter of the wall member 13a was built to be larger than the wind flux of the fan 11, and the outer diameter of the wall member 13b was built to be equal to or smaller than the wind flux of the fan 11. The rotation speed was similarly observed also in the case in which the wall member was not provided, which is not illustrated.

As a result, in the case in which the wall member 13a was provided (FIG. 7A), the rotation speed of the wind turbine 12 significantly dropped compared with the case in which the wall member was not provided. This is for a reason that, since the wind source is the fan, basically, only the wind flux corresponding to the diameter of vanes of the fan 11 is obtained, and the outer diameter of the wall member which is larger than the wind speed of the fan 11 completely blocks the wind flow toward the rear of the wind turbine 12. Also, in the case in which the wall member 13b was provided (FIG. 7B), the rotation speed of the wind turbine increased compared with the case in which the wall member 13a was provided. This is conceivably for a reason that, when the wall member 13b having the outer diameter equal to or smaller than the wind flux of the fan 11 is provided, part of the wind volume flows to the rear of the wind turbine, therefore pulls the wind which passes the wind turbine, and increases the speed.

When wind passes a wind turbine, the energy thereof is taken, and the wind speed thereof is reduced. This means that the temperature drops in terms of kinetic theory of molecules. The above described experiment means that the reduced energy of the wind flow in the rear of the wind turbine is compensated for by mixture/friction with the outside air flow having a high wind speed, in other words, having large kinetic pressure/kinetic energy, and the speed of the wind flow in the rear of the wind turbine is increased. As a result, it can be understood that it is important to forcibly drive off the wind, which passes the wind turbine, toward the rear of the wind turbine to increase the rotation speed of the wind turbine.

In view of the foregoing circumstances, it is an object of the present invention to solve the problems of conventional techniques and to provide a wind-speed accelerating wind turbine that increases the wind speed in the rear of a wind turbine and the wind speed at a vent part of a nacelle, thereby improving the rotation efficiency of the wind turbine, increasing generated power, and improving the problem of height of the apparatus, stability of the apparatus, and stability of nacelle support.

Solution to Problem

A wind-speed accelerating wind turbine of the present invention for achieving the above described object includes: a wind turbine; and a nacelle, wherein the wind turbine is installed in the nacelle, the nacelle includes: a front nacelle member having a cross-section area formed so as to linearly or curvilinearly contract from a wind inlet to an installed position of the wind turbine; and a rear nacelle member having the contracted cross-section area formed so as to linearly or curvilinearly expand or maintain the same cross-section area from the installed position of the wind turbine to a wind outlet, and a wind dispersion part that disperses wind outside the nacelle is formed at a rim of the wind outlet of the rear nacelle member (claim 1).

The nacelle exhibits the effects of speeding up the wind and guiding the wind by the wind turbine by the front nacelle member having the cross-section area formed so as to linearly or curvilinearly contract along the flowing direction of the wind from the wind inlet to the installed position of the wind turbine. Then, since there is the rear nacelle member having the contracted cross-section area formed so as to linearly or curvilinearly expand or maintain the same cross-section area along the flowing direction of the wind from the installed position of the wind turbine to the wind outlet, the effect of speeding up the wind, which flows into the wind turbine, is exerted.

In the wind-speed accelerating wind turbine, the nacelle is preferred to be built so that the cross-section area of the wind inlet and the cross-section area of the wind outlet are approximately two times of the cross-section area at the position of the wind turbine installed in the nacelle (Patent Literature 2).

The shape of the wind dispersion part is not limited as long as the wind dispersion part disperses the wind outside the nacelle and causes the wind outside the nacelle to increase the contact area with the wind in the nacelle to forcibly drive off the wind which has a low flow speed in the rear of the wind turbine.

First Embodiment

The above described wind dispersion part is characterized by being a star-shaped wind dispersion part formed outside the rim of the wind outlet of the rear nacelle member. According to this embodiment, the wind outside the nacelle can be dispersed, and the wind having a low flow speed in the rear of the wind turbine can be forcibly driven off.

Second Embodiment

The above described wind dispersion part is characterized by being a flange-shaped wind dispersion part formed outside the rim of the outlet of the rear nacelle member. Also according to this embodiment, the wind outside the nacelle can be dispersed, and the wind having a low flow speed in the rear of the wind turbine can be forcibly driven off.

Third Embodiment

The above described wind dispersion part is characterized by being a plurality of notched wind dispersion parts formed around the outlet of the rear nacelle member. Also according to this embodiment, the wind outside the nacelle can be dispersed, and the wind having a low flow speed in the rear of the wind turbine can be forcibly driven off.

Note that the shape of the wind dispersion part is not limited to the above described shapes. The wind dispersion part disperses the wind, which flows outside the nacelle, the contact area between the dispersed wind and the wind which flows out from the wind outlet of the rear nacelle member can be increased, mixture of the wind is facilitated, eventually, the speed of the flown out wind can be effectively increased, and the wind in the nacelle can be forcibly driven off.

Advantageous Effects of Invention

According to the present invention, the wind speed in the rear of the wind turbine is increased, and the wind speed at a vent part of the nacelle is increased. As a result, the wind-speed accelerating wind turbine that improves the rotation efficiency of the vanes of the wind turbine, increases generated power, and improves the problem of the height of the apparatus, stability of the apparatus, and stability of the nacelle can be provided.

BRIEF DESCRIPTION OF DRAWINGS

FIG. 2A to FIG. 2C illustrate front views illustrating examples of star-shaped wind dispersion parts FIGS. 2A, 2B and 2C.

FIG. 3 illustrates a front view of a flange-shaped wind dispersion part.

FIG. 4 illustrates a lateral view and a front view of the notched wind dispersion parts.

FIG. 5 illustrates a front view of a gear-shaped wind dispersion part.

DESCRIPTION OF EMBODIMENTS

Hereinafter, based on wind-speed accelerating wind turbines and wind dispersion parts of FIG. 1A to FIG. 6, details thereof will be described.

Figure 1A:
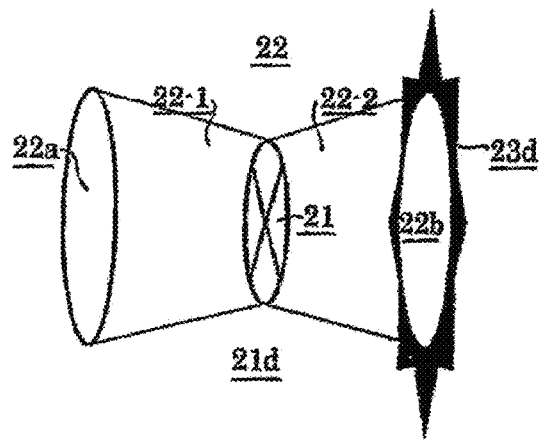
FIG. 1A to FIG. 1C illustrate conceptual diagrams FIGS. 1A, 1B and 1C of wind-speed accelerating wind turbines of the present invention.
Figure 1B:
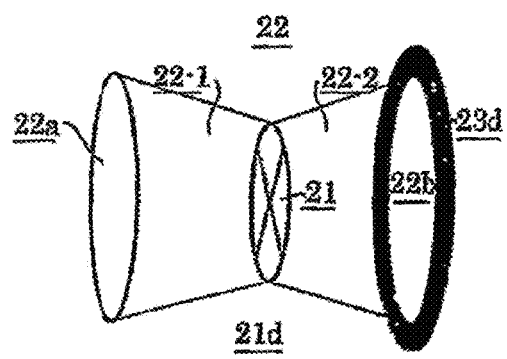
Figure 1C:
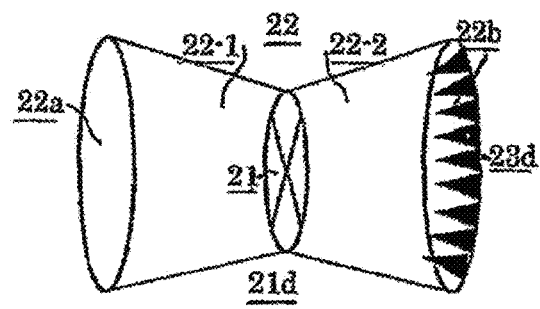

FIGS. 1A, 1B and 1C are conceptual diagrams of wind-speed accelerating wind turbines of the present invention. In the diagrams, wind turbines are represented by 21, installation positions of the wind turbines 21 are represented by 22d, nacelles are represented by 22, front nacelle members are represented by 22-1, rear nacelle members are represented by 22-2, wind inlets are represented by 22a, and wind outlets are represented by 22b.

The present invention is characterized by forming a wind dispersion part 23d, which disperses the air outside the nacelle 22, at a rim of the wind outlet 22b of the rear nacelle member 22-2.

Conceivable examples of the wind dispersion part 23d include star-shaped wind dispersion parts illustrated in FIGS. 2A, 2B and 2C, a flange-shaped wind dispersion part illustrated in FIG. 3, a notched wind dispersion part illustrated in FIG. 4, and a gear-shaped wind dispersion part illustrated in FIG. 5, but are not limited to these shapes.

In the wind-speed accelerating wind turbines illustrated in FIG. 1A to FIG. 1C, a star-shaped wind dispersion part is formed in FIG. 1A, a flange-shaped wind dispersion part is formed in FIG. 1B, and a notched wind dispersion part is formed in FIG. 1C.

Figure 6:
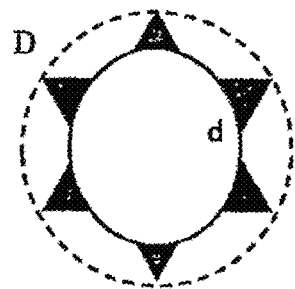
FIG. 6 illustrates a front view describing the size of a star-shaped wind dispersion part.
Figure 7A:
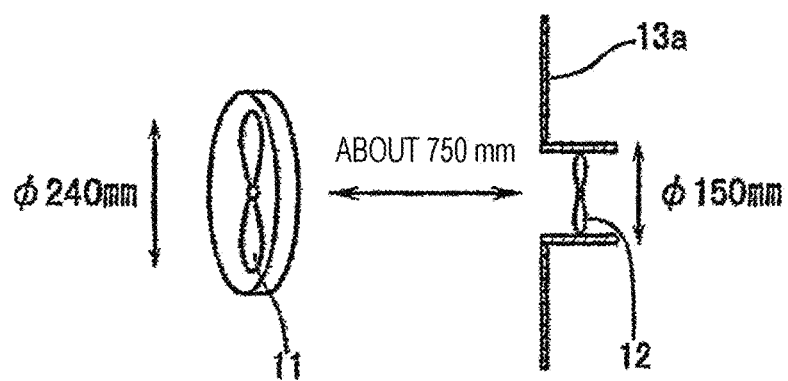
FIG. 7A and FIG. 7B illustrate experiment diagrams of wind turbine efficiency.
Figure 7B:
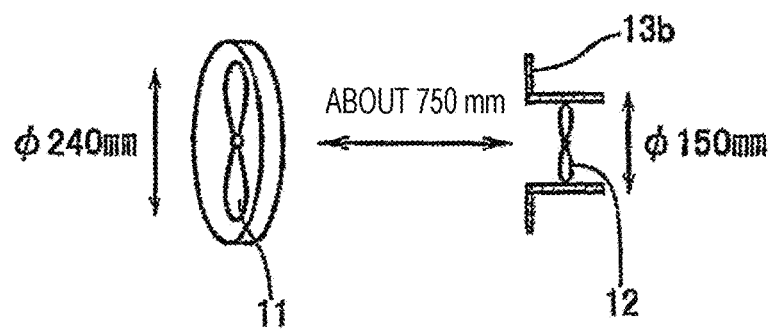

Examples of the star-shaped wind dispersion part of FIG. 1A include a hexagonal shape, an eight-pointed shape, and a 16-pointed shape as illustrated in FIGS. 2A, 2B and 2C. As illustrated in FIG. 6, the area of the circle formed by an outer circumferential circle D connecting outermost parts of the star-shaped wind dispersion part is preferred to be two times or more of the area of the circle formed by an outer diameter d of the wind outlet 22b of the nacelle 22.

In order to cause the pressure loss by the wind dispersion part to have the resistance that does not disturb inflow of wind to an outer nacelle, the area of the wind dispersion part is preferred to be smaller than the area of the part through which wind passes. In FIG. 6, the circle formed by an outer dotted line is a virtual circle diameter connecting vertices of the star-shaped wind dispersion part, and the circle illustrated by an inner solid line is the outer diameter of the wind outlet 22b of the nacelle 2. In the circle-diameter strip-shaped space sandwiched by the virtual circle diameter D and the wind outlet outer diameter d, the area of the star-shaped wind dispersion part is preferred to be about half of or less than the area of the other part.

As illustrated in FIG. 5, the gear-shaped wind dispersion part can be also used. Other than that, a wave shape or a flange shape can be also used, but the shape is not limited thereto. A porous plate shape can be also applied, but has to be designed so as not to increase pressure loss.

In the case of the flange-shaped wind dispersion part of FIG. 1B, as illustrated in FIG. 3, regarding the height of the flange, half of the difference between the outer diameter D of the flange and the inner diameter d of the wind outlet 22b is preferred to be 1/10 to 1/5 of the inner diameter d.

In the case of the notched wind dispersion part of FIG. 1C, as illustrated in FIG. 4, notches are not limited to be continuous, but may have intervals therebetween. However, from a viewpoint of pressure loss at the notched part, the total area of the notched part is preferred to be around the area that exceeds half of the area of the surrounding part of the notches.

Fourth Embodiment

Next, another embodiment of the wind-speed accelerating wind turbine will be described.

The embodiment is a wind-speed accelerating wind turbine including: a wind turbine; an inner nacelle; and an outer nacelle provided outside the inner nacelle, wherein the wind turbine is installed in the inner nacelle, the inner nacelle includes: a front nacelle member having a cross-section area formed so as to linearly or curvilinearly contract from a wind inlet to an installed position of the wind turbine; and a rear nacelle member having the contracted cross-section area formed so as to linearly or curvilinearly expand or maintain the same cross-section area from the installed position of the wind turbine to a wind outlet, and a wind dispersion part is formed at the wind outlet of the rear nacelle member (claim 2).

Hereinafter, details thereof will be described based on the conceptual diagrams of wind-speed accelerating wind turbines illustrated in FIG. 8 and FIG. 9.

In the diagrams, wind turbines are represented by 21, inner nacelles are represented by 22, and outer nacelles provided outside the inner nacelles 22 are represented by 25. The wind turbine 21 is installed in the inner nacelle 22.

Figure 8:
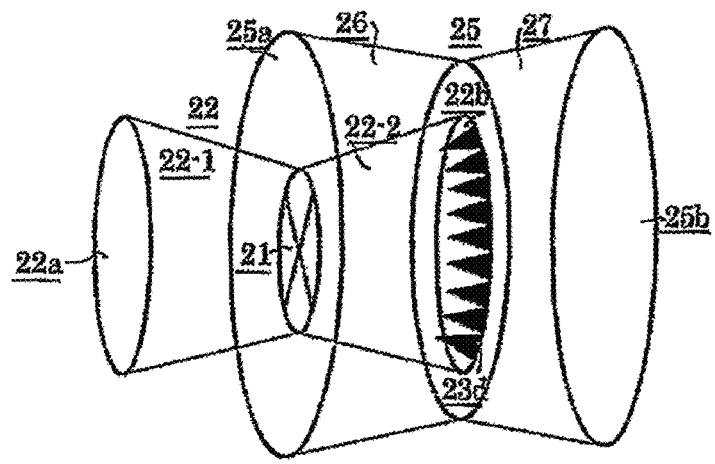
FIG. 8 illustrates a conceptual diagram of a wind-speed accelerating wind turbine of the present invention.

In FIG. 8, the inner nacelle 22 has a front nacelle member 22-1 having a cross-section formed so as to linearly or curvilinearly contract from a wind inlet 22a to the installed position of the wind turbine 21 and has a rear nacelle member 22-2 having the contracted cross-section area formed so as to linearly or curvilinearly expand or maintain the same cross-section area from the installed position of the wind turbine 21 to a wind outlet 22b, and a plurality of notched wind dispersion parts 23d is formed around the wind outlet 22b of the rear nacelle member 22-2.

The outer nacelle 25 includes a front outer nacelle member 26 having a cross-section formed so as to linearly or curvilinearly contract from a wind inlet 25a to a position corresponding to the wind outlet 22b of the inner nacelle 22 or to a vicinity thereof and has a rear outer nacelle member 27 having the contracted cross-section area linearly or curvilinearly expanded or maintaining the same cross-section area from the position corresponding to the wind flow wind outlet 22b of the inner nacelle 22 or the vicinity thereof to a wind outlet 25b of the outer nacelle 25.

Moreover, the wind inlet 25a of the outer nacelle 25 is disposed so as to be positioned in the rear of the position corresponding to the wind inlet 22a of the inner nacelle 22, and the wind outlet 25b of the outer nacelle 25 is built to be disposed so as to be disposed in the rear of the position corresponding to the wind outlet 22b of the inner nacelle 22.

By virtue of the above described configuration, a straight flow channel of wind is formed between the inner nacelle 22 and an inner wall of the outer nacelle 25, ensures intake of wind, and improves rotation efficiency of the wind turbine 21.

In the diagrams, the rear outer nacelle member 27 of the outer nacelle 25 is formed so as to expand the cross-section area thereof toward the wind outlet 25b. However, even when the rear outer nacelle member 27 is a straight tube having the same cross-section area, similar effects can be obtained. An example in which the wind inlet 25a of the rear outer nacelle member 27 is disposed at the position corresponding to the wind outlet 22b of the inner nacelle member 22 has been shown. However, the wind inlet 25a is only required to be in the vicinity of the corresponding position and may be in the near side or the far side of the wind outlet 22b of the inner nacelle 22.

Furthermore, since the notched wind dispersion parts 23d are formed on the wind outlet 22b of the inner nacelle 22, the wind from the outer nacelle 25 is dispersed, and an effect of driving the wind, which flows out from the inner nacelle 22, is exerted.

Fifth Embodiment

Figure 9:
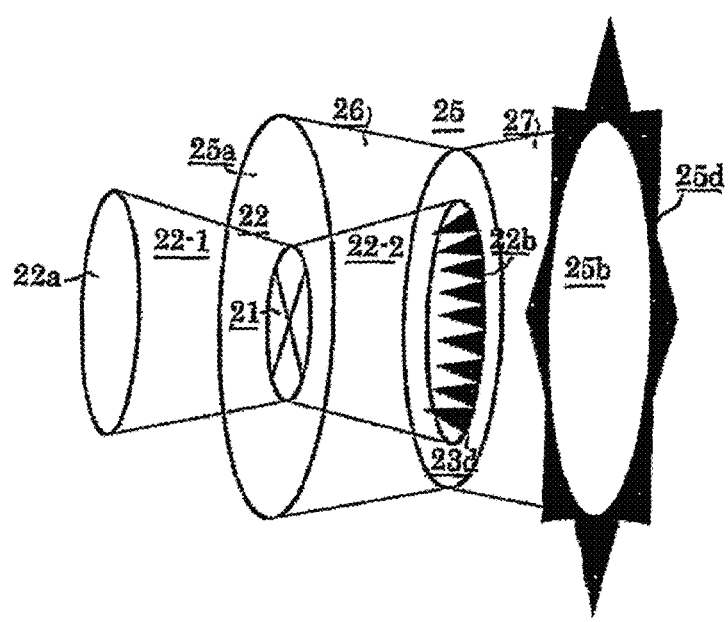
FIG. 9 illustrates a conceptual diagram of a wind-speed accelerating wind turbine of the present invention.

In FIG. 9, in the wind-speed accelerating wind turbine of the above described fourth embodiment, a star-shaped wind dispersion part 25d is further formed at the wind outlet 25b of the outer nacelle 25. According to this configuration, the effect that the wind flowing outside the outer nacelle 25 is dispersed, enters inside the outer nacelle 25, and discharges the air in the outer nacelle 25 and, eventually, the air in the inner nacelle 22 is high, which is preferable.

Sixth Embodiment

Figure 10:
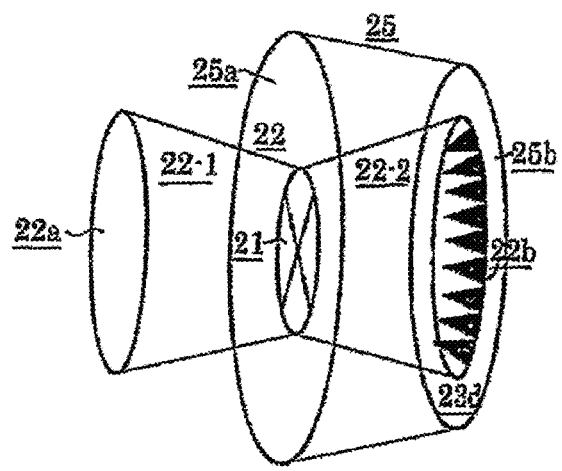
FIG. 10 illustrates a conceptual diagram of a wind-speed accelerating wind turbine of the present invention.

In FIG. 10, a wind turbine is represented by 21, and the wind turbine 21 is installed in an inner nacelle 22.

The inner nacelle 22 has a front nacelle member 22-1 having the cross-section area thereof formed so as to linearly or curvilinearly contract from a wind inlet 22a to the installed position of the wind turbine 21 and has a rear nacelle member 22-2 having the contracted cross-section area formed so as to linearly or curvilinearly expand or maintain the same cross-section area from the installed position of the wind turbine 21 to a wind outlet 22b, and a plurality of notched wind dispersion parts 23d is formed around the wind outlet 22b of the rear nacelle member 22-2.

Also, the above described outer nacelle 25 has the cross-section area thereof formed so as to linearly or curvilinearly contract from the wind inlet 25a to the wind outlet 25b. Moreover, the wind inlet 25a of the outer nacelle 25 is disposed so as to be positioned in the rear of the position corresponding to the wind inlet 22a of the inner nacelle 22, and the wind outlet 25b of the outer nacelle 25 is disposed approximately at the same position as the wind outlet 22b of the inner nacelle 22.

Also by virtue of the above described configuration, intake of wind is ensured, and rotation efficiency of the wind turbine 21 is improved. Furthermore, since the notched wind dispersion parts 23d are formed on the wind outlet 22b of the inner nacelle 22, the wind from the outer nacelle 25 is dispersed, and an effect of driving the wind, which flows out from the inner nacelle 22, is exerted.

Seventh Embodiment

Figure 11:
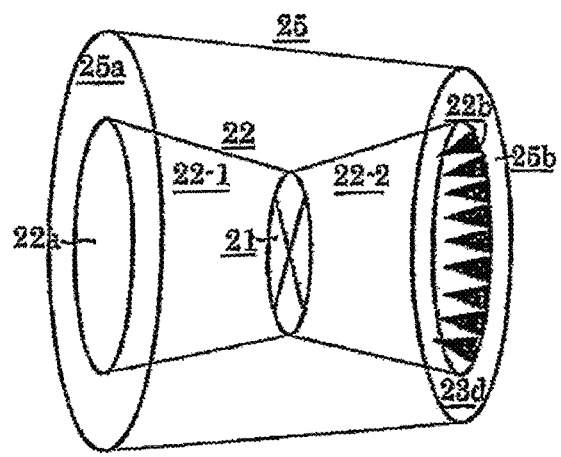
FIG. 11 illustrates a conceptual diagram of a wind-speed accelerating wind turbine of the present invention.

In FIG. 11, the wind-speed accelerating wind turbine of the above described tenth embodiment is built so that the wind inlet 22a and the wind outlet 22b of the inner nacelle 22 are at the same position as the wind inlet 25a and the wind outlet 25b of the outer nacelle 25, respectively. Also by virtue of this configuration, intake of wind is ensured, and rotation efficiency of the wind turbine 21 is improved.

Eighth Embodiment

Next, another embodiment of the wind-speed accelerating wind turbine will be described.

The embodiment is a wind-speed accelerating wind turbine including: a wind turbine; an inner nacelle; and an outer nacelle provided outside the inner nacelle, wherein the wind turbine is installed in the inner nacelle, the inner nacelle includes: a front nacelle member having a cross-section area formed so as to linearly or curvilinearly contract from a wind inlet to an installed position of the wind turbine; and a rear nacelle member having the contracted cross-section area formed so as to linearly or curvilinearly expand or maintain the same cross-section area from the installed position of the wind turbine to a wind outlet, a wind dispersion part is built at the wind outlet of the rear nacelle member, and the outer nacelle member has a wind inlet at a position corresponding to a wind outlet of the inner nacelle or in a vicinity thereof and is formed so as to linearly or curvilinearly expand or maintain the same cross-section area from the wind inlet to the wind outlet (claim 3).

Figure 12:
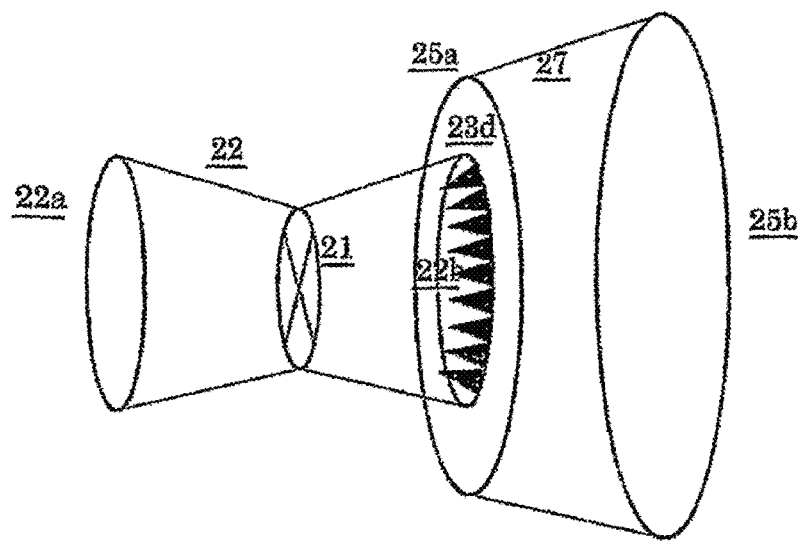
FIG. 12 illustrates a conceptual diagram of a wind-speed accelerating wind turbine of the present invention.

Details thereof will be described based on FIG. 12. The notched wind dispersion parts 23d are built at the wind outlet 22b of the rear nacelle member 22-2 of the inner nacelle 22, the wind inlet 25a of the outer nacelle 27 is at the position corresponding to the wind outlet 22d of the inner nacelle 22 or in the vicinity thereof, and the cross-section area is formed to linearly or curvilinearly expand or maintain the same cross-section area from the wind inlet 25a to the wind outlet 25b.

The notched wind dispersion parts 23d disperse the wind, which is to flow into the outer nacelle 27, and allow the wind to flow into the outer nacelle 27, thereby increasing the contact area with the wind, which is discharged from the inner nacelle 22 in a wind downstream part of the wind turbine 21, and further facilitating discharge of the wind.

Ninth Embodiment

Figure 13:
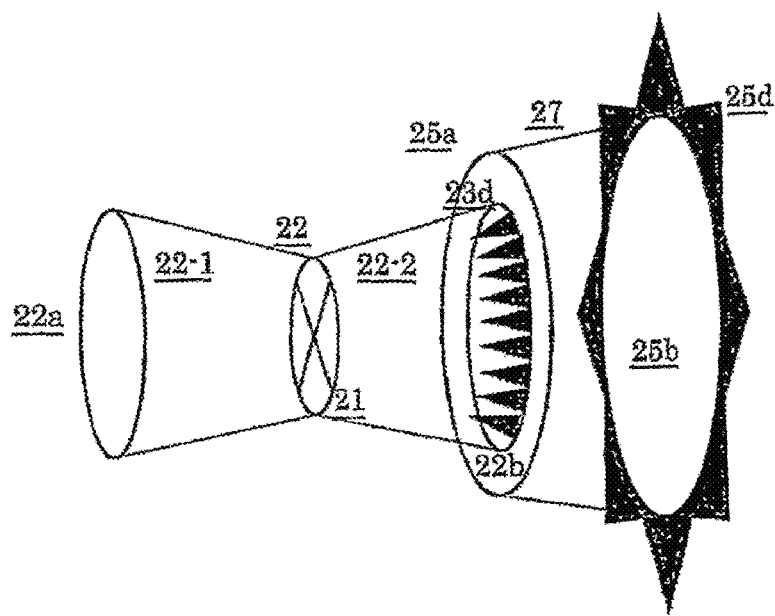
FIG. 13 illustrates a conceptual diagram of a wind-speed accelerating wind turbine of the present invention.

In FIG. 13, in the wind-speed accelerating wind turbine of the above described twelfth embodiment, the star-shaped wind dispersion part 25d is formed at the wind outlet 25b of the outer nacelle 27. In addition to above described working, the star-shaped wind dispersion part 25d disperses the wind outside the outer nacelle 27 and forcibly drives off the wind, which has a low flow speed in the rear of the wind turbine 21.

Tenth Embodiment

Figure 14:
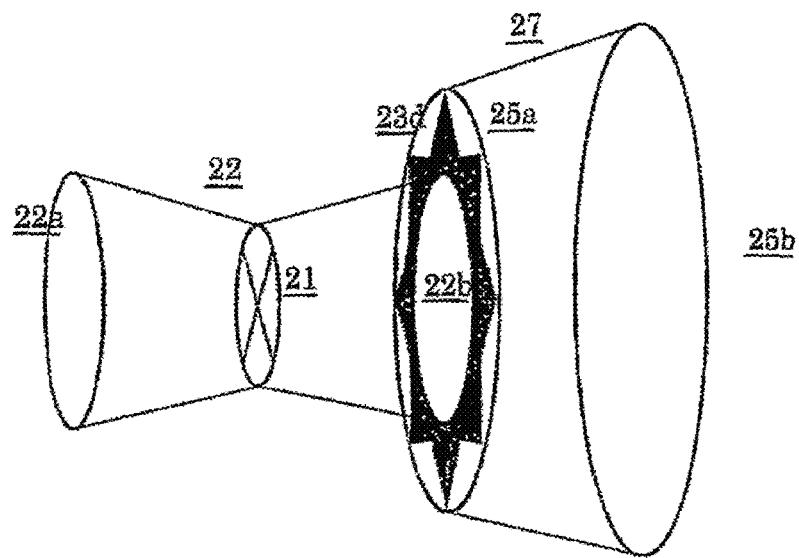
FIG. 14 illustrates a conceptual diagram of a wind-speed accelerating wind turbine of the present invention.

In FIG. 14, the wind inlet 25a of the outer nacelle 27 is at the position corresponding to the wind outlet 22b of the inner nacelle 22 or in the vicinity thereof, the outer nacelle 27 is formed so as to linearly or curvilinearly expand or maintain the same cross-section area from the wind inlet 25a to the wind outlet 25b, and a star-shaped wind dispersion part 23d is formed at the wind inlet 25a.

The star-shaped wind dispersion part 23d disperses the wind, which is to flow into the outer nacelle 27, and allows the wind to flow into the outer nacelle 27, thereby increasing the contact area with the wind, which is discharged from the inner nacelle 22 in a wind downstream part of the wind turbine 21, and further facilitating discharge of the wind.

Eleventh Embodiment

Figure 15:
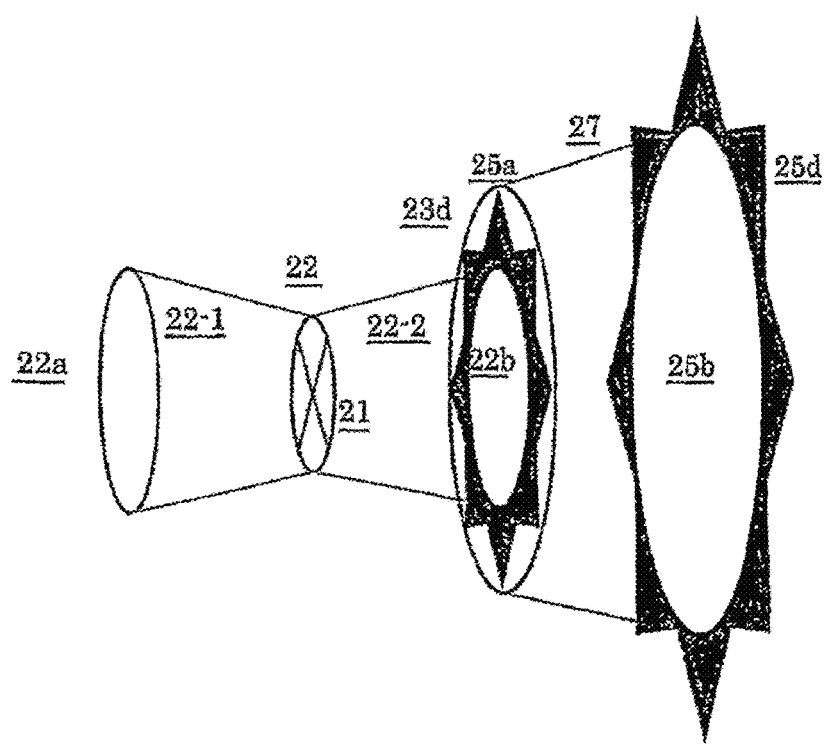
FIG. 15 illustrates a conceptual diagram of a wind-speed accelerating wind turbine of the present invention.

In FIG. 15, in the wind-speed accelerating wind turbine of FIG. 14, the star-shaped wind dispersion part 25d is further formed on the wind outlet 25b of the outer nacelle 27. In addition to above described working, the star-shaped wind dispersion part 25d disperses the wind outside the outer nacelle 27 and forcibly drives off the wind, which has a low flow speed in the rear of the wind turbine 21.

Twelfth Embodiment

Furthermore, another embodiment of the wind-speed accelerating wind turbine will be described.

The embodiment is a wind-speed accelerating wind turbine including: an inner nacelle in which a wind turbine is installed; and an outer nacelle provided outside the inner nacelle, wherein the inner nacelle integrally includes a front inner nacelle member having a wind inlet having a flat transverse cross-section having a width longer than a height and includes a rear inner nacelle member having a wind outlet having a flat transverse cross-section having a width longer than a height, the front inner nacelle member has a transverse cross-section area formed so as to contract from the wind inlet to a connecting part with the rear inner nacelle member, the rear inner nacelle member is formed so as to expand or maintain the same transverse cross-section area from the contracted connecting part of the front inner nacelle member to the wind outlet and has a wind dispersion part or a wind dispersion shape at a periphery of the wind outlet, the wind turbine is installed in a vicinity of the connecting part of the front inner nacelle member and the rear inner nacelle member and is configured to have a wind dispersion part in a gap that is not the wind turbine at the connecting part of the front inner nacelle member and the rear inner nacelle member, the outer nacelle integrally includes a front outer nacelle member having a wind inlet having a flat transverse cross-section having a width longer than a height and includes a rear outer nacelle member having a wind outlet having a flat transverse cross-section having a width longer than a height, the front outer nacelle member has a transverse cross-section area formed so as to contract from the wind inlet to a connecting part with the rear outer nacelle member, the rear outer nacelle member is formed so as to expand from the contracted connecting part of the front outer nacelle member to the wind outlet and has a wind dispersion part or a wind dispersion shape in a periphery of the wind outlet, the wind inlet of the front outer nacelle member is disposed between the connecting part of the front inner nacelle member and the rear inner nacelle member and the wind outlet of the rear inner nacelle member, and the wind outlet of the rear inner nacelle member is disposed at or in a vicinity of the connecting part of the front outer nacelle member and the rear outer nacelle member (claim 4).

Figure 16:
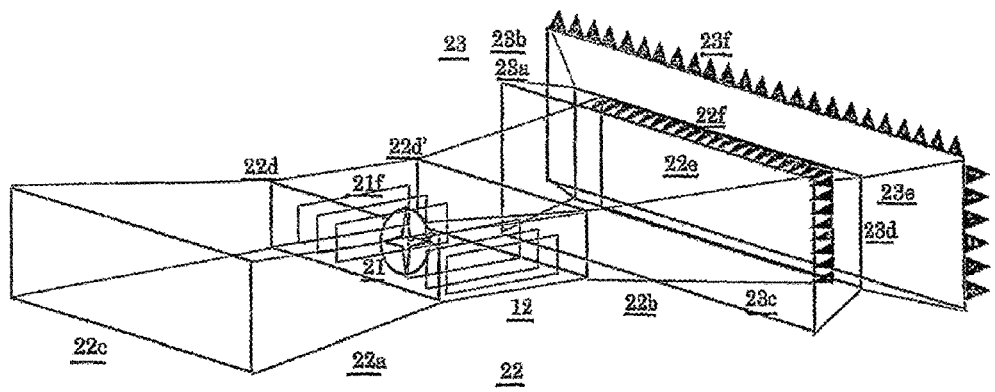
FIG. 16 illustrates a conceptual diagram of a wind-speed accelerating wind turbine of the present invention.

Details thereof will be described based on FIG. 16. A wind-speed accelerating wind turbine includes a tubular inner nacelle 22 having a flat rectangular cross-section having a width longer than a height, includes a tubular outer nacelle 23 provided outside the inner nacelle 22 and having a flat rectangular cross-section having a width longer than a height, and includes a wind turbine 21.

The inner nacelle 22 integrally includes a front inner nacelle member 22a, an intermediate nacelle member 12, and a rear inner nacelle member 22b, and the wind turbine 21 is installed in the intermediate nacelle member 12. Note that the wind turbine 21 may be installed at a rear end of the front inner nacelle member 22a. A wind dispersion part 21f is installed in a gap beside the wind turbine 21. A notched wind dispersion part 22f is provided at a wind outlet 22e of the inner nacelle 22.

An outer nacelle member 23 integrally includes a front outer nacelle member 23a having a cross-section area contracted along the flowing direction of wind and includes a rear outer nacelle member 23b, which oppositely expands, and a wind dispersion part 23f is provided also at the wind outlet 23b of the outer nacelle 23.

In the above described configuration, the transverse cross-section areas of a wind inlet 22c, a connecting part 22d, a wind outlet 22e, a wind inlet 23c, a connecting part 23d, and a wind outlet 23e are mutually related in the following manner.

The transverse cross-section area of the wind inlet 22c is larger than the transverse cross-section area of the connecting part 22d, the transverse cross-section area of the connecting part 22d is smaller than or equal to the transverse cross-section area of the wind outlet 22e, the total transverse cross-section area of the wind inlet 23c (including the transverse cross-section area of the rear inner nacelle member 22d) is smaller than the area of the wind outlet 23e, and the substantial transverse cross-section area of the wind inlet 23c (the area obtained by subtracting the transverse cross-section area of the rear inner nacelle member 22b from the total cross-section area of the wind inlet 23c) is larger than the substantial transverse cross-section area of the connecting part 23d (the area obtained by subtracting the transverse cross-section area of the rear inner nacelle member 22b from the total area of the connecting part 23d).

Since the inner nacelle 22 is built in the above described manner, gaps which allow wind to flow therethrough without being disturbed are formed in both sides and/or on the upper/lower surfaces in the wind turbine 21 side. Therefore, the wind flows through the gaps without being disturbed, high-speed airflows of the flowed wind are supplied to the rear of the wind turbine 21, the collected high-speed wind flows drive off the wind flows which have reduced speeds in the rear of the wind turbine, and the speed energy of the wind turbine 21 is recovered.

Moreover, in this embodiment, the wind dispersion part 21f is provided in a gap other than the wind turbine 21 of the intermediate nacelle member 12. The wind dispersion part 21f is preferred to be a louver type. Louvers have the effect of joining the flowing directions of wind into one direction and are therefore effective for the wind to discharge the wind of the wind turbine 21. The louver type can be designed so as to reduce pressure loss.

Also, the wind dispersion part 22f provided at the wind outlet 22e of the inner nacelle 22 disperses the wind which flows in from outside the inner nacelle 22 and increases the contact area with the wind which is in the rear of the wind turbine 21, thereby facilitating mixture and improving discharge of the wind. Furthermore, in this embodiment, the wind dispersion part 23f is provided also at the wind outlet 23e of the outer nacelle 23.

Thirteenth Embodiment

Figure 17:
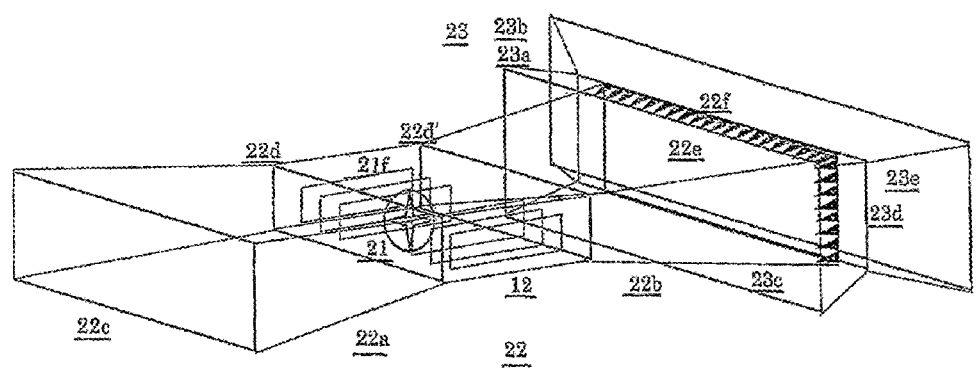
FIG. 17 illustrates a conceptual diagram of a wind-speed accelerating wind turbine of the present invention.

FIG. 17 illustrates an embodiment related to the above described embodiment and illustrates an example in which, in the case in which the wind turbine 21 is installed, the wind dispersion part 21f is provided in a gap beside the wind turbine 21, and the wind dispersion part 22f is provided at the wind outlet 22e of the inner nacelle 22.

Fourteenth Embodiment

Figure 18:
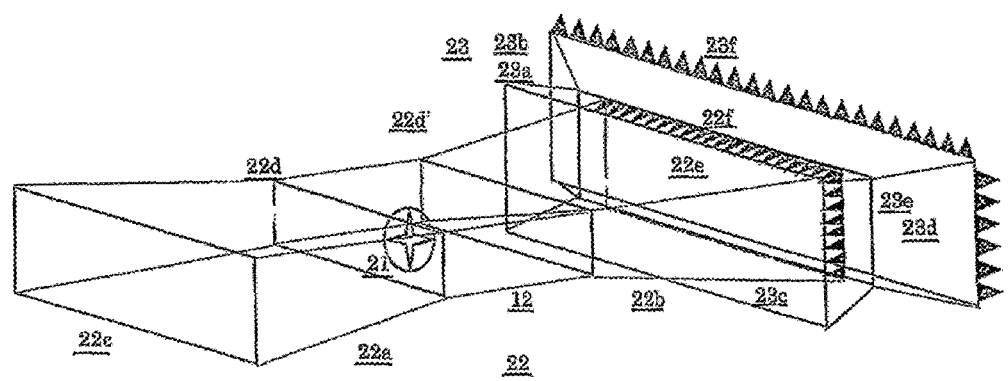
FIG. 18 illustrates a conceptual diagram of a wind-speed accelerating wind turbine of the present invention.
Figure 20:
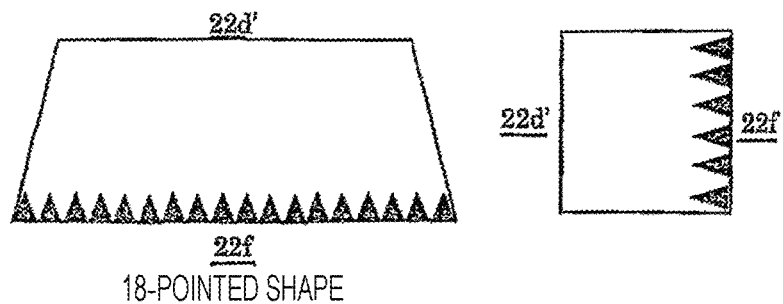
FIG. 20 illustrates a plan view and a lateral view of notched wind dispersion parts.

FIG. 18 also illustrates an embodiment related to the above described embodiment and illustrates an example in which, in the case in which the wind turbine 21 is installed, the wind dispersion part 21f in the gap beside the wind turbine 21 is removed, the wind dispersion part 22f is provided at the wind outlet 22e of the inner nacelle 22, and the wind dispersion part 23f is provided also at the wind outlet 23e of the outer nacelle 23. FIG. 20 illustrates a plan view and a lateral view of the notched wind dispersion parts of FIG. 16, FIG. 17, and FIG. 18.

Fifteenth Embodiment

A wind-speed accelerating wind turbine includes: an inner nacelle in which a wind turbine is installed; and an outer nacelle provided outside the inner nacelle, wherein the inner nacelle integrally includes a front inner nacelle member having a wind inlet having a flat transverse cross-section having a width longer than a height and includes a rear inner nacelle member having a wind outlet having a flat transverse cross-section having a width longer than a height, the front inner nacelle member has a cross-section area formed so as to linearly or curvilinearly tilted and contracted and gradually forms a wind dispersion shape from the wind inlet to a connecting part with an intermediate nacelle member, the intermediate nacelle member maintains the wind dispersion shape and is connected to the rear inner nacelle member, the rear inner nacelle member having the contracted transverse cross-section area of the front inner nacelle member formed so as to expand or maintain the same cross-section area from an outlet of the intermediate nacelle member to the wind outlet while maintaining the wind dispersion shape from the outlet of the intermediate nacelle member to the wind outlet, the wind turbine is installed in a vicinity of the connecting part of the front inner nacelle member and the intermediate nacelle member, a wind dispersion part is configured to be provided also in a gap that is not the wind turbine of the intermediate nacelle member, the outer nacelle integrally includes a front outer nacelle member having a wind inlet having a flat transverse cross-section having a width longer than a height and includes a rear outer nacelle member having a wind outlet having a flat transverse cross-section having a width longer than a height and has a cross-section area that is a wind dispersion shape, the front outer nacelle member has the cross-section area formed so as to contract from the wind inlet to a connecting part with the rear outer nacelle member, the rear outer nacelle member is formed so that the contracted transverse cross-section area of the front outer nacelle member expands from the connecting part with the front outer nacelle member to the wind outlet, the wind inlet of the front outer nacelle member is disposed between the connecting part of the front inner nacelle member and the rear inner nacelle member and the front of the wind outlet of the rear inner nacelle member, and the wind outlet of the rear inner nacelle member is disposed at or in a vicinity of the connecting part of the front outer nacelle member and the rear outer nacelle member.

Details thereof will be described based on FIGS. 19A, 19B, 19C and 19D.

Figure 19A:
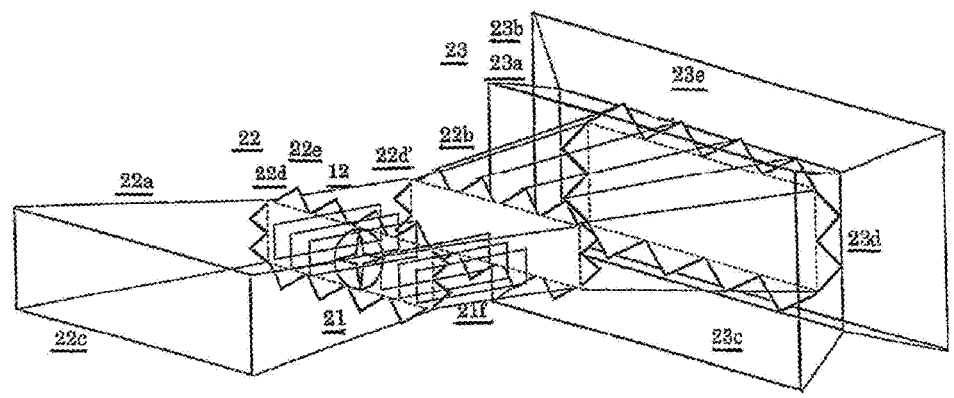
FIG. 19A to FIG. 19D illustrate conceptual diagrams FIGS. 19A, 19B, 19C and 19D of wind-speed accelerating wind turbines of the present invention.

FIG. 19A is a perspective view of a wind-speed accelerating wind turbine in which a wind dispersion part 21f is installed in a gap beside the wind turbine 21. The wind-speed accelerating wind turbine integrally includes a tubular inner nacelle 22 having a flat rectangular cross-section having a width longer than a height and includes a tubular outer nacelle 23 provided outside the inner nacelle 22 and having a flat rectangular shape having a width longer than a height, and the wind turbine 21 is installed at a predetermined position in an intermediate nacelle member 12.

The inner nacelle 22 integrally includes a front inner nacelle member 22a including a flat rectangular cross-section having a transverse cross-section area having a width longer than a height and including a cross-section of a wind dispersion shape, includes the intermediate nacelle member 12 maintaining the wind dispersion shape, and includes a rear inner nacelle member 22b expanding the cross-section area while maintaining the wind dispersion shape.

The wind turbine 21 may be installed at a rear end of the front inner nacelle member 22a and at a connecting part 22d of the intermediate nacelle member 12. The wind dispersion part 21f of a louver type is installed in the gap beside the wind turbine 21, and the transverse cross-section of the rear inner nacelle member 22b has a wind dispersion shape from the intermediate nacelle member 12 to the wind outlet 22e of the rear inner nacelle member 22b.

The outer nacelle member 23 integrally includes a front outer nacelle member 23a having a cross-section area contracted along the flowing direction of wind and includes a rear outer nacelle member 23b, which oppositely expands.

The front inner nacelle member 22a is formed to contract so that the shape thereof is gradually changed from the flat rectangular shape to the wind dispersion shape from the wind inlet 22c to the connecting part 22d. Moreover, the intermediate nacelle member 12 is formed so that the cross-section shape of the flat wind dispersion shape having a width longer than a height maintains a constant cross-section area from the connecting part 22d to 22d'.

The rear inner nacelle member 22b linearly or curvilinearly tilts an end shape of the intermediate nacelle member 12, which has changed into the wind dispersion shape, along the flowing direction of wind and expands while maintaining the shape from the connecting part 22d' to the wind outlet 22e.

The front outer nacelle member 23 is formed so as to have the cross-section area linearly or curvilinearly tilted along the flowing direction of wind and contract while maintaining the shape from the wind inlet 23c to the connecting part 23d.

The rear outer nacelle member 23b is formed so as to have the cross-section area linearly or curvilinearly tilted along the flowing direction of wind and expand while maintaining the shape from the connecting part 23d to a wind outlet 23e.

Figure 19B:
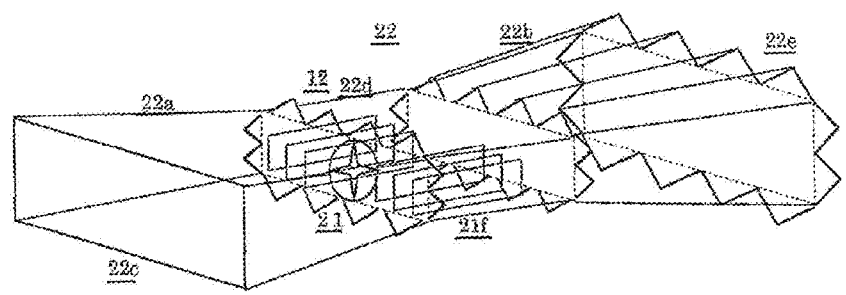

Note that FIG. 19B is a perspective view of the inner nacelle 22 of the wind-speed accelerating wind turbine of FIG. 19A (perspective view without the outer nacelle 23) and illustrates a state that integrally includes the front inner nacelle member 22a including a flat rectangular cross-section having a transverse cross-section area having a width longer than a height and including a cross-section of a wind dispersion shape, includes the intermediate nacelle member 12 maintaining the wind dispersion shape, and includes the rear inner nacelle member 22b expanding the cross-section area while maintaining the wind dispersion shape.

Figure 19C:
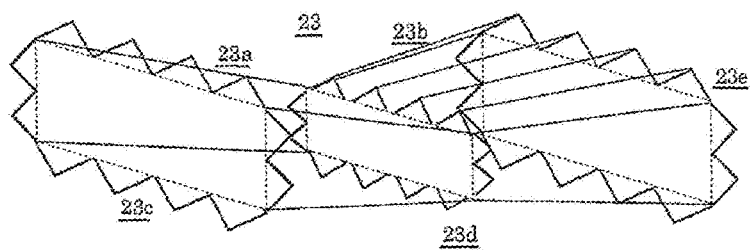

FIG. 19C is a perspective view of the outer nacelle 23 of the wind-speed accelerating wind turbine of FIG. 19A (perspective view in which the shape of the outer nacelle 23 is a dispersion part) and illustrates a state that integrally includes the front outer nacelle member 23a having the cross-section area contracted along the flowing direction of wind and includes the rear outer nacelle member 23b which oppositely expands.

Figure 19D:
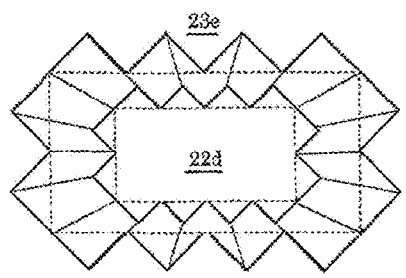

Also, FIG. 19D is a schematic view of the wind dispersion shape when the inner nacelle 22 is viewed from the upstream side of wind and illustrates a star-shaped wind dispersion shape as an example.

In above described FIG. 19B, FIG. 19C, and FIG. 19D, the same parts as FIG. 19A are denoted by the same reference signs.

According to the above described embodiment, wind blows through the gaps in both sides of the wind dispersion shape and the wind turbine 21. As a result, high-speed airflows are supplied to the rear of the wind turbine 21, the wind flows which have reduced speed in the rear of the wind turbine 21 are driven off, and the speed energy of the wind turbine 21 can be recovered.

Sixteenth Embodiment

Furthermore, another embodiment of the wind-speed accelerating wind turbine will be described.

The embodiment is a wind-speed accelerating wind turbine including a wind turbine; and a nacelle, wherein the wind turbine is installed in the nacelle, and the nacelle includes: a front nacelle member having a cross-section area formed so as to have a circular (including elliptical and polygonal) wind inlet, linearly or curvilinearly contract, and gradually form a wind dispersion shape from the wind inlet to an installed position of the wind turbine; and a rear nacelle member having a cross-section area linearly or curvilinearly expanding or maintaining the same cross-section area while maintaining the wind dispersion shape from the installed position of the wind turbine to a wind outlet (claim 5).

Figure 21:
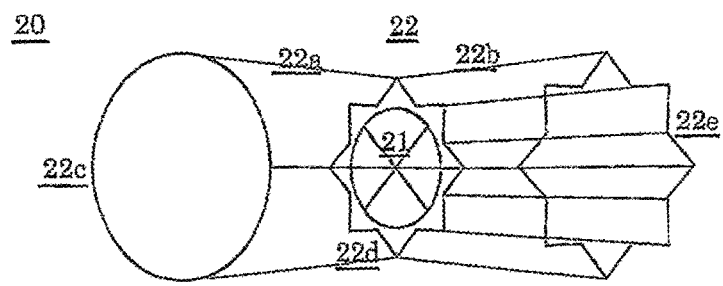
FIG. 21 illustrates a conceptual diagram of a wind-speed accelerating wind turbine of the present invention.

Details thereof will be described based on FIG. 21. A nacelle 22 in which a wind turbine 21 is installed is formed so that a front part 22a in front of the installation position of the wind turbine 21 (a connecting part 22d of the front nacelle member 22a and a rear nacelle member 22b) continuously reduces the cross-section area thereof from a wind inlet 22c and forms a star-shaped wind dispersion shape, and a rear part 22b in the rear of the position 22d of the wind turbine 21 is configured to have a wind dispersion shape which expands the cross-section area or maintains the constant cross-section area to a wind outlet 22e while maintaining the wind dispersion shape.

The cross-section area of the front nacelle member 22a is reduced from the wind inlet 22c, the rear nacelle member 22b is expanded or maintained at the constant cross-section area and is continued to the wind outlet 22e. As a result, the wind speed of the wind flowing in can be effectively increased, and the effect of increasing the rotation speed of the wind turbine 21 is exerted compared to otherwise.

Furthermore, since the wind dispersion shape is formed at the position 22d of the wind turbine 21, a large gap is formed between the wind turbine 21 and the nacelle 22, and the wind which passes the wind turbine position 22 without passing the wind turbine 21 is increased. This wind effectively facilitates driving off the wind which has a reduced wind speed in the rear of the wind turbine 21. Furthermore, since the wind which flows outside the rear nacelle member 22b having the wind dispersion shape is dispersed, the contact area with the wind inside the nacelle 22 is increased, and the effect of further strongly driving the wind, which is to flow out from the nacelle 22, is therefore generated.

Seventeenth Embodiment

A wind-speed accelerating wind turbine characterized by including an outer nacelle provided outside a nacelle, wherein the outer nacelle includes: a front outer nacelle member having a cross-section area formed so that a circular (including elliptical and polygonal) wind inlet linearly or curvilinearly contracts at or to a position corresponding to a wind outlet of the nacelle (hereinafter, referred to as the inner nacelle) or a vicinity thereof; and a rear outer nacelle member having the contracted cross-section area formed so as to linearly or curvilinearly expand or maintain the same cross-section area from the position corresponding to the wind outlet of the inner nacelle or the vicinity thereof to a wind outlet of the outer nacelle.

Figure 22:
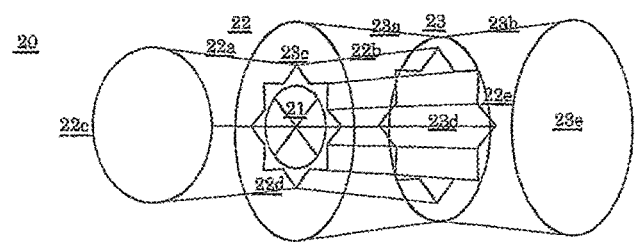
FIG. 22 illustrates a conceptual diagram of a wind-speed accelerating wind turbine of the present invention.
Figure 25:
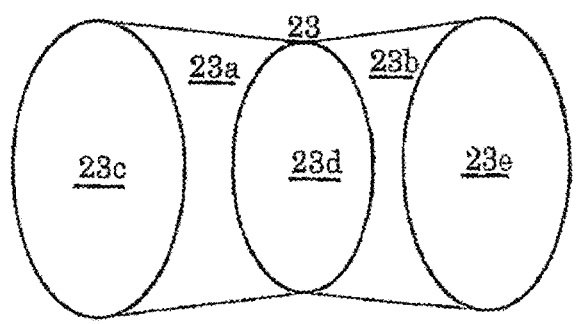
FIG. 25 is a conceptual diagram of an outer nacelle.

FIG. 22 illustrates an example in which an outer nacelle 23 is installed. The wind-speed accelerating wind turbine shown herein has the configuration in which the outer nacelle 23 illustrated in FIG. 25 is installed in the wind-speed accelerating wind turbine of FIG. 21. If the outer nacelle 23 has a front 23a contracting in the flowing direction of wind and has a rear 23b expanding from a connecting part 23d, the connecting part 23d is preferred to be in a vicinity of the wind outlet 22e of the inner nacelle 22. FIG. 25 illustrates the case in which he outer nacelle maintains a constant cross-section area, and the installation position of the outer nacelle 23 is not limited as long as the wind outlet 22e of the inner nacelle 22 is at a position that is housed in the outer nacelle 23. Providing the outer nacelle 23 exerts a large effect of driving off the wind inside the wind-collecting wind turbine 20. Therefore, the effect of further increasing the rotation speed of the wind turbine 21 is exerted.

Eighteenth Embodiment

A wind-speed accelerating wind turbine characterized by including an outer nacelle provided outside a nacelle, wherein the outer nacelle includes: a front outer nacelle member having a cross-section area formed so that an inlet has a wind dispersion shape and linearly or curvilinearly contracts at or to a position corresponding to a wind outlet of the nacelle (hereinafter, referred to as the inner nacelle) or a vicinity thereof; and a rear outer nacelle member having the contracted cross-section area formed so as to linearly or curvilinearly expand or maintain the same cross-section area while maintaining the wind dispersion shape from the position corresponding to the wind outlet of the inner nacelle or the vicinity thereof to a wind outlet.

Figure 23:
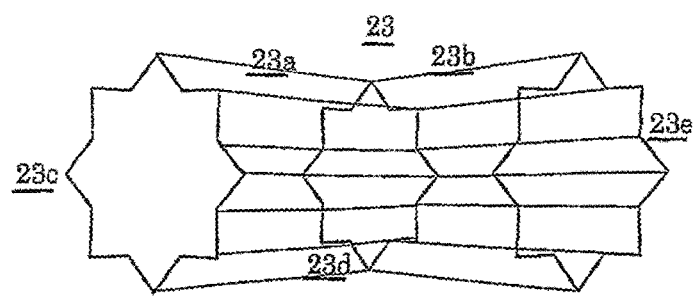
FIG. 23 is a conceptual diagram of an outer nacelle.

An outer nacelle 23 illustrated in FIG. 23 forms a wind dispersion shape from a wind inlet 23c thereof, includes a front outer nacelle member 23a having a cross-section area formed so as to linearly or curvilinearly contract to a position corresponding to a wind outlet of a nacelle (hereinafter, referred to as the inner nacelle) or a vicinity thereof, and includes a rear outer nacelle member 23b having the contracted cross-section area linearly or curvilinearly expanded or maintaining the same cross-section area while maintaining the wind dispersion shape from the position corresponding to the wind outlet of the inner nacelle or the vicinity thereof to a wind outlet 23e. Therefore, the wind which passes inside the outer nacelle 23 is dispersed, and the effect of discharging the wind, which is discharged from the inner nacelle 22, to outside can be further enhanced.

Nineteenth Embodiment

A wind-speed accelerating wind turbine characterized by including an outer nacelle provided outside a nacelle, wherein the outer nacelle includes: a front outer nacelle member having a cross-section area formed so that a circular (including elliptical and polygonal) wind inlet linearly or curvilinearly contracts while forming a wind dispersion shape at or to a position corresponding to a wind outlet of the nacelle (hereinafter, referred to as the inner nacelle) or a vicinity thereof; and a rear outer nacelle member having the contracted cross-section area formed so as to linearly or curvilinearly expand or maintain the same cross-section area while maintaining the wind dispersion shape from the position corresponding to the wind outlet of the inner nacelle or the vicinity thereof to a wind outlet.

Figure 24:
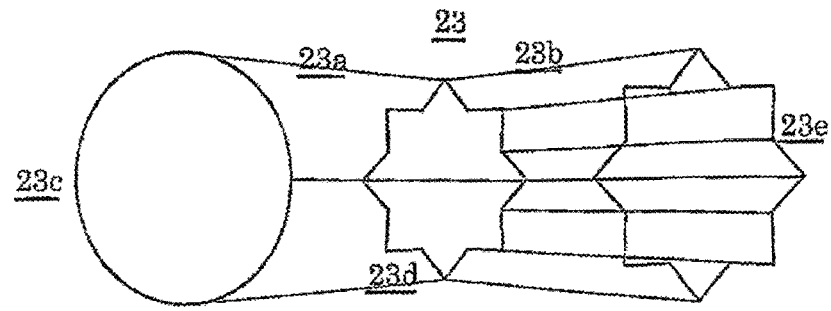
FIG. 24 is a conceptual diagram of an outer nacelle.

An outer nacelle 23 illustrated in FIG. 24 includes: a front outer nacelle member 23a having a cross-section area formed so that a wind inlet 23c is circular (including elliptical and polygonal) and forms a wind dispersion shape while linearly or curvilinearly contracting from or at a position corresponding to a wind outlet of a nacelle (hereinafter, referred to as the inner nacelle) or a vicinity thereof; and a rear outer nacelle member 23b having the contracted cross-section area linearly or curvilinearly expanded or maintaining the same cross-section area while maintaining the wind dispersion shape from the position corresponding to the wind outlet of the inner nacelle or the vicinity thereof to a wind outlet 23e. Therefore, the wind which passes inside the outer nacelle 23 is dispersed, and the effect of discharging the wind, which is discharged from the inner nacelle 22, to outside can be further enhanced.

Twentieth Embodiment

A wind-speed accelerating wind turbine characterized in that an outer nacelle provided outside a nacelle has a cross-section area formed so as to linearly or curvilinearly contract or the cross-section area maintains the constant cross-section area from a wind inlet to the rear of a wind outlet of an inner nacelle.

Figure 26:
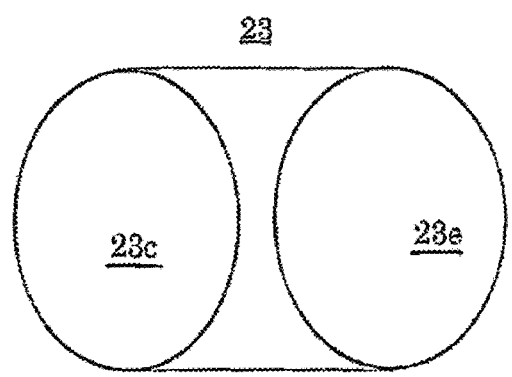
FIG. 26 is a conceptual diagram of an outer nacelle.

Outer nacelles 23 illustrated in FIG. 25 and FIG. 26 do not have a wind dispersion shape, but have a cross-section area formed so as to linearly or curvilinearly contract or maintain the constant cross-section area from a wind inlet 23c to the rear of a wind outlet of an inner nacelle.

The installation position in this case is not limited as long as a wind outlet 22e of an inner nacelle 22 is housed in the outer nacelle 23, the wind which passes inside the outer nacelle 23 is dispersed, and the effect of discharging the wind, which is discharged from the inner nacelle 22, can be further enhanced.

INDUSTRIAL APPLICABILITY

According to the wind-speed accelerating wind turbine of the present invention in which the wind dispersion part of the present invention is formed, a high generated voltage can be obtained, and applicability is high in the technical fields that require high wind power energy such as the field of wind power generation.

The invention claimed is:
1. A wind-speed accelerating wind turbine, comprising:
a wind turbine; and
a nacelle, wherein
the wind turbine is installed in the nacelle,
the nacelle includes:
   a front nacelle member having a cross-section area formed so as to linearly or curvilinearly contract from a wind inlet to an installed position of the wind turbine; and
   a rear nacelle member having the contracted cross-section area formed so as to linearly or curvilinearly expand or maintain the same cross-section area from the installed position of the wind turbine to a wind outlet,
a wind dispersion part that disperses wind outside the nacelle is formed at a rim of the wind outlet of the rear nacelle member,
the wind dispersion part includes a plurality of isosceles triangles extending radially outwardly from the rim of the wind outlet and equally spaced from each other to form a star-shape.
2. A wind-speed accelerating wind turbine, comprising:
a wind turbine;
an inner nacelle; and
an outer nacelle provided outside the inner nacelle, wherein
the wind turbine is installed in the inner nacelle,
the inner nacelle includes:
   a front nacelle member having a cross-section area formed so as to linearly or curvilinearly contract from a first wind inlet to an installed position of the wind turbine;
a rear nacelle member having the contracted cross-section area formed so as to linearly or curvilinearly expand or maintain the same cross-section area from the installed position of the wind turbine to a first wind outlet, and
a connecting part connecting the front nacelle member and the rear nacelle member,
a first wind dispersion part is formed at the first wind outlet of the rear nacelle member, and
the outer nacelle includes
a front outer nacelle member having a second wind inlet between the connecting part and the first wind outlet, and
a rear outer nacelle member having
a second wind outlet spaced away from the first wind outlet, and
a second wind dispersion part including a plurality of isosceles triangles extending radially outwardly from a rim of the second wind outlet and equally spaced from each other to form a star-shape.

3. A wind-speed accelerating wind turbine, comprising:
a wind turbine;
an inner nacelle; and
an outer nacelle provided outside the inner nacelle, wherein
the wind turbine is installed in the inner nacelle,
the inner nacelle includes:
a front nacelle member having a cross-section area formed so as to linearly or curvilinearly contract from a first wind inlet to an installed position of the wind turbine; and
a rear nacelle member having the contracted cross-section area formed so as to linearly or curvilinearly expand or maintain the same cross-section area from the installed position of the wind turbine to a first wind outlet,
a wind dispersion part is built at the first wind outlet of the rear nacelle member, and includes a plurality of isosceles triangles extending radially outwardly from a rim of the first wind outlet and equally spaced from each other to form a star-shape,
the outer nacelle has
a second wind inlet at a position corresponding to the first wind outlet of the inner nacelle or in a vicinity thereof, and
a second wind outlet spaced away from the second wind inlet, and
the outer nacelle is formed so as to linearly or curvilinearly expand or maintain the same cross-section area from the second wind inlet to the second wind outlet.

4. A wind-speed accelerating wind turbine, comprising:
an inner nacelle in which a wind turbine is installed; and
an outer nacelle provided outside the inner nacelle, wherein
the inner nacelle integrally includes
a front inner nacelle member having a first wind inlet having a flat transverse cross-section having a width longer than a height and
a rear inner nacelle member having a first wind outlet having a flat transverse cross-section having a width longer than a height,
the front inner nacelle member has a transverse cross-section area formed so as to contract from the first wind inlet to a first connecting part with the rear inner nacelle member,
the rear inner nacelle member is formed so as to expand or maintain the same transverse cross-section area from the contracted first connecting part of the front inner nacelle member to the first wind outlet and has a first wind dispersion part or a first wind dispersion shape at the first wind outlet,
the wind turbine is installed in a vicinity of the first connecting part of the front inner nacelle member and the rear inner nacelle member and is configured to have a second wind dispersion part in a gap that is not the wind turbine at the first connecting part of the front inner nacelle member and the rear inner nacelle member,
the outer nacelle integrally includes
a front outer nacelle member having a second wind inlet having a flat transverse cross-section having a width longer than a height, and
a rear outer nacelle member having a second wind outlet having a flat transverse cross-section having a width longer than a height,
the front outer nacelle member has a transverse cross-section area formed so as to contract from the second wind inlet to a second connecting part with the rear outer nacelle member,
the rear outer nacelle member is formed so as to expand from the contracted second connecting part of the front outer nacelle member to the second wind outlet and has a third wind dispersion part or a second wind dispersion shape at the second wind outlet,
the second wind inlet of the front outer nacelle member is disposed between the first connecting part of the front inner nacelle member and the rear inner nacelle member and the first wind outlet of the rear inner nacelle member, and
the first wind outlet of the rear inner nacelle member is disposed at or in a vicinity of the second connecting part of the front outer nacelle member and the rear outer nacelle member.

5. The wind-speed accelerating wind turbine according to claim 4, wherein
the first wind dispersion part is a plurality of notches at the first wind outlet,
the second wind dispersion part is a louver configured to join flowing directions of wind into one direction, and
the third wind dispersion part is a plurality of triangles extending radially outwardly from a rim of the second wind outlet.

6. A wind-speed accelerating wind turbine comprising:
a wind turbine; and
a nacelle, wherein
the wind turbine is installed in the nacelle, and
the nacelle includes:
a front nacelle member having a cross-section area formed so as to have a circular (including elliptical and polygonal) wind inlet, linearly or curvilinearly contract, and gradually form a dispersion shape from the wind inlet to an installed position of the wind turbine; and
a rear nacelle member having a cross-section area linearly or curvilinearly expanding or maintaining the same cross-section area while maintaining the wind dispersion shape from the installed position of the wind turbine to a wind outlet.

7. The wind-speed accelerating wind turbine according to claim 6, wherein
the dispersion shape is a plurality of triangles extending radially outwardly to form a star shape.

\* \* \* \* \*